(12) United States Patent
Chen et al.

(10) Patent No.: US 11,946,276 B2
(45) Date of Patent: Apr. 2, 2024

(54) JOINT FOR SWIMMING POOL AND SWIMMING POOL

(71) Applicant: BESTWAY INFLATABLES & MATERIAL CORP., Shanghai (CN)

(72) Inventors: Xiaobo Chen, Jinhua (CN); Zhichao Zhao, Jinhua (CN); Zhipeng Dai, Jinhua (CN); Feng Ye, Jinhua (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 6 days.

(21) Appl. No.: 17/977,755

(22) Filed: Oct. 31, 2022

(65) Prior Publication Data

US 2023/0051223 A1  Feb. 16, 2023

Related U.S. Application Data

(62) Division of application No. 17/307,744, filed on May 4, 2021, now abandoned.

(30) Foreign Application Priority Data

May 8, 2020  (CN) .......................... 202020747119.6

(51) Int. Cl.
*E04H 4/00* (2006.01)
*F16B 7/04* (2006.01)

(52) U.S. Cl.
CPC .......... *E04H 4/0056* (2013.01); *F16B 7/042* (2013.01); *E04H 2004/0068* (2013.01)

(58) Field of Classification Search
CPC ....................... E04H 4/0056; E04H 2004/0068
USPC .............................................. 4/506
See application file for complete search history.

(56) References Cited

U.S. PATENT DOCUMENTS

| | | | |
|---|---|---|---|
| 2016/0215513 A1* | 7/2016 | Liu | E04H 4/1272 |
| 2017/0089085 A1* | 3/2017 | Liu | E04H 4/0056 |
| 2019/0301184 A1* | 10/2019 | Huang | E04H 4/0056 |
| 2021/0324648 A1* | 10/2021 | Huang | E04H 4/0056 |
| 2022/0034113 A1* | 2/2022 | Huang | F16B 7/0446 |

* cited by examiner

*Primary Examiner* — Huyen D Le
(74) *Attorney, Agent, or Firm* — DICKINSON WRIGH PLLC

(57) ABSTRACT

A joint for a swimming pool frame, and a swimming pool including the joint are provided. The joint includes a joint body including a leg pipe holder configured to have a leg pipe of the swimming pool frame inserted into the leg pipe holder. The joint also includes a side pipe holder configured to have a side pipe of the swimming pool frame inserted in the side pipe holder. A locking hole is formed through the side pipe holder. The joint body also includes a locking part including a locking pin configured to extend through the locking hole and through a corresponding connecting hole in the side pipe, thereby holding the side pipe to the side pipe holder.

12 Claims, 8 Drawing Sheets

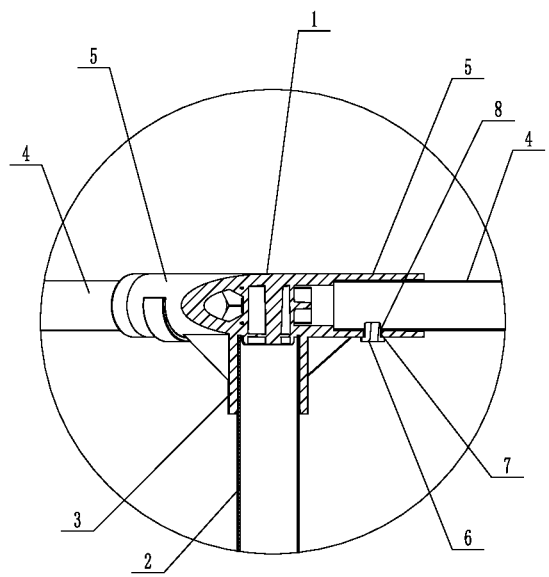
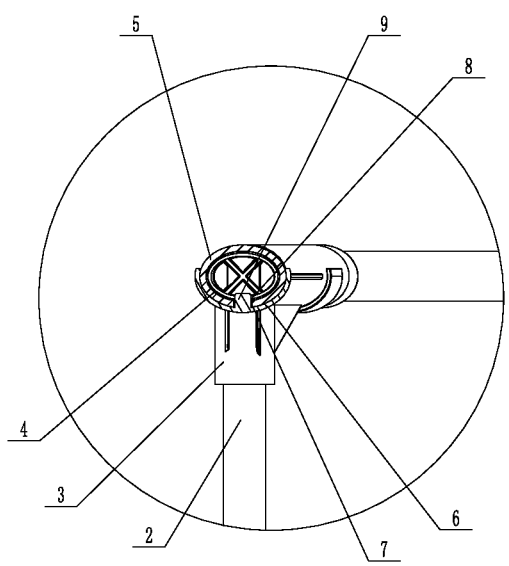
*Fig. 10*     *Fig. 11*
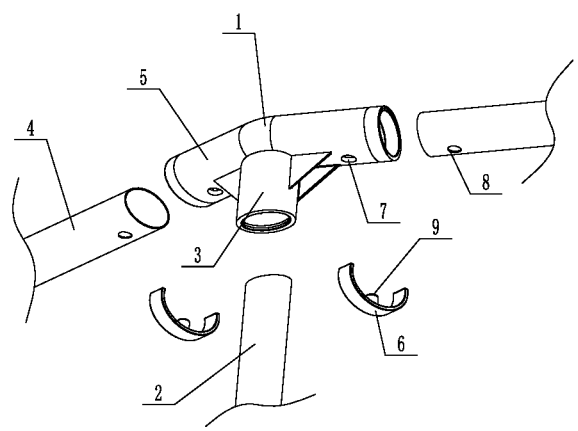
*Fig. 12*

JOINT FOR SWIMMING POOL AND SWIMMING POOL

CROSS-REFERENCE TO RELATED APPLICATION

This application is a divisional of and claims priority to U.S. patent application Ser. No. 17/307,744, filed May 4, 2021, which claims priority from Chinese patent Application CN202020747119.6 filed on May 8, 2020 in China, the disclosure of which is incorporated herein by reference in its entirety.

BACKGROUND

1. Field

Apparatuses and methods consistent with exemplary embodiments relate to a frame swimming pool, and in particular, to a joint for a swimming pool and a swimming pool including the same.

2. Description of Related Art

Above-ground pools generally include inflatable pools and frame pools, among other types, and are widely loved due to convenient installation and use. One example of a current above-ground, detachable swimming pool includes a frame and a liner. The frame supports the liner and may be formed by assembling side pipes, leg pipes, and support joints. A support joint may include three directional interfaces which are respectively connected to corresponding side pipes and a corresponding leg pipe. A number of such support joints are connected to the side pipes and the leg pipes, thereby forming an integral frame. No additional mechanical connecting structure or fitting for fixing is used in conjunction with the leg pipes, the side pipes, and the support joints of the frame, and a size of a space defined only by an outer perimeter of the frame is greater than a diameter of a pool cavity formed by the liner supported by the frame. In this way, the side pipes and the leg pipes are inserted into and fixed to the support joints by virtue of a contraction pulling force generated by a weight of water in the cavity formed by the liner. Such a structure, however, is relatively unsafe due to impact by waves on connections between the side pipes and the support joints. The resultant risk of disconnection between the side pipes and the support joints is relatively high without the use of additional mechanical connection structures or fittings for fixing, causing potential safety problems.

SUMMARY

Example embodiments may address at least the above problems and/or disadvantages and other disadvantages not described above. Also, example embodiments are not required to overcome the disadvantages described above, and may not overcome any of the problems described above.

One or more example embodiments may provide a joint for a swimming pool which provides reliable connection after the joint is assembled to form a frame.

According to an aspect of an example embodiment, a joint for a swimming pool frame comprises a joint body comprising a leg pipe holder configured to have a leg pipe of the swimming pool frame inserted therein, and a side pipe holder configured to have a side pipe of the swimming pool frame inserted therein, and comprising a locking hole formed therethrough; and a locking part comprising a locking pin configured to extend through the locking hole and through a corresponding connecting hole in the side pipe, thereby holding the side pipe to the side pipe holder.

According to an aspect of another example embodiment, the joint may further comprise two of the side pipe holders and two of the locking parts, each of the two locking parts holding a respective side pipe to a respective one of the two side pipe holders.

According to an aspect of another example embodiment, the locking hole may be formed through a lower half of an outer circumferential wall of the side pipe holder, and the connecting hole may be formed through a lower half of an outer circumferential wall of the side pipe.

According to an aspect of another example embodiment, the side pipe holder may further comprise a clearance groove formed in an outer circumferential wall of the side pipe holder and in communication with the locking hole, and the locking part may further comprise an extended portion extending from and integrally formed with the side pipe holder, the locking pin being disposed at a distal end of the extended portion.

According to an aspect of another example embodiment, the joint may further comprise a positioning ring configured to fit within a distal end of the side pipe holder, an arc-shaped positioning plate extending from the positioning ring, the arc-shaped positioning plate configured to fit within the side pipe, and a locking bar extending from the positioning ring, the locking pin disposed at a distal end of the locking bar, and the locking bar configured to fit within the side pipe.

According to an aspect of another example embodiment, the joint may further comprise a connecting sleeve disposed on an outer circumferential wall of the side pipe holder around the locking hole, wherein the locking part further comprises a barrel-type cap having an open end and a closed end, the locking pin being attached to the closed end within the barrel-type cap and extending out of the locking part.

According to an aspect of another example embodiment, the locking part may further comprise an extended portion hinged to an outer circumferential wall of the side pipe holder, the locking pin disposed at a first end of the extended portion, and a positioning spring mounted between a second end of the extended portion and the outer circumferential wall of the side pipe holder.

According to an aspect of another example embodiment, the locking part may further comprise a C-shaped structure configured to be clamped on an outer circumferential wall of the side pipe holder, the locking pin disposed on an inner wall of the C-shaped structure.

According to an aspect of another example embodiment, the locking part may further comprise a mounting ring configured to fit within an end of the side pipe, the locking pin being mounted on the mounting ring, and a locking spring disposed between the mounting ring and the locking pin and biasing the locking pin outward from the mounting ring.

According to an aspect of another example embodiment, the joint body may be made of a plastic material.

According to an aspect of another example embodiment, the joint may further comprise a metal pipe disposed within an inner circumferential wall of the leg pipe; and a plastic sleeve tube disposed within an inner circumferential wall of the metal pipe and configured to have the leg pipe of the swimming pool frame inserted therein.

According to an aspect of another example embodiment, a swimming pool may comprise a liner; and a frame configured to support the liner. The frame may comprise a plurality of side pipes, a plurality of leg pipes, and a plurality of joints according to one or more of the aspects described above.

BRIEF DESCRIPTION OF THE DRAWINGS

The above and/or other example aspects will become apparent and more readily appreciated from the following description of example embodiments, taken in conjunction with the accompanying drawings in which:

FIG. 10 is a structural schematic view of a joint according to a fifth example embodiment;

FIG. 11 is a sectional view showing a connection of a locking part and the joint of FIG. 10;

FIG. 12 is an exploded view of the joint of FIG. 10 invention;

DETAILED DESCRIPTION

Figure 1:
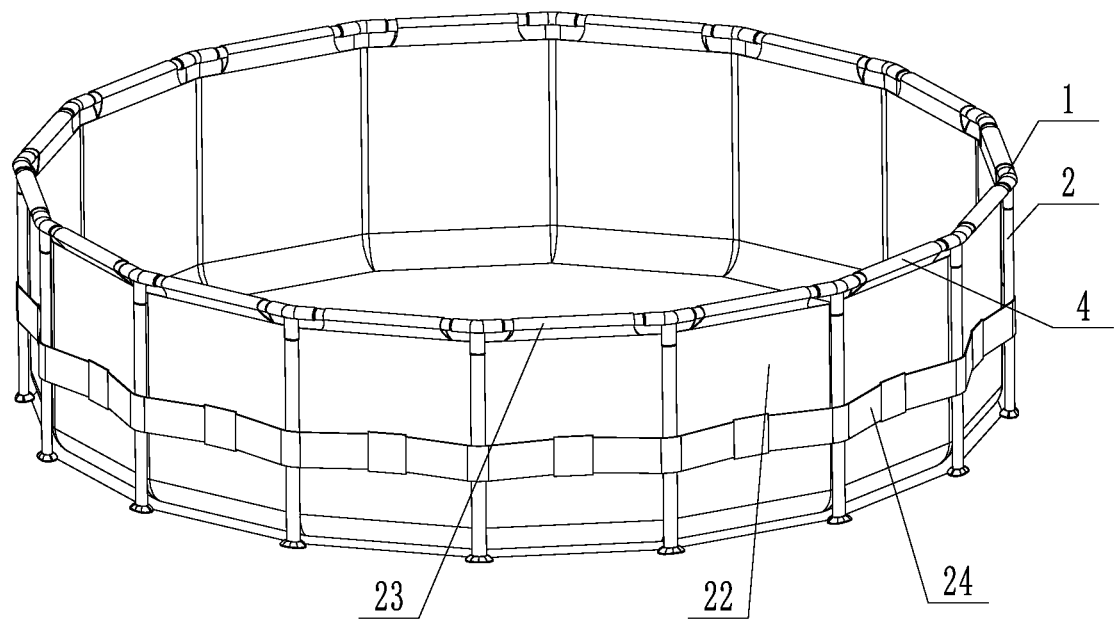
FIG. 1 is a structural schematic view of a frame swimming pool, according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/ or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

Figure 2:
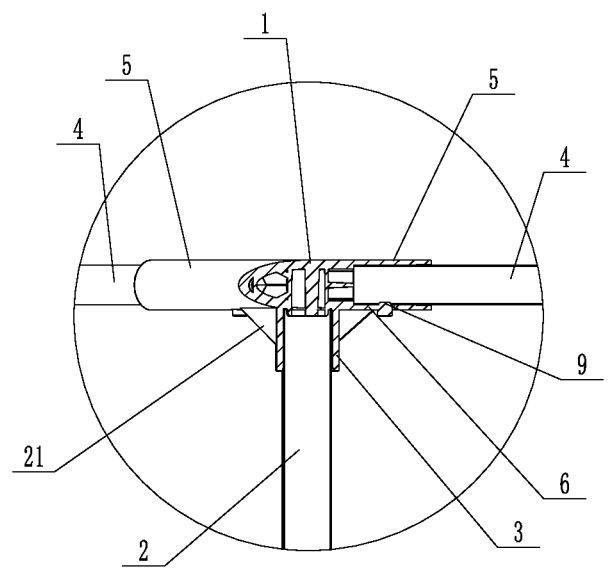
FIG. 2 is a structural schematic view of a joint according to a first example embodiment.
Figure 3:
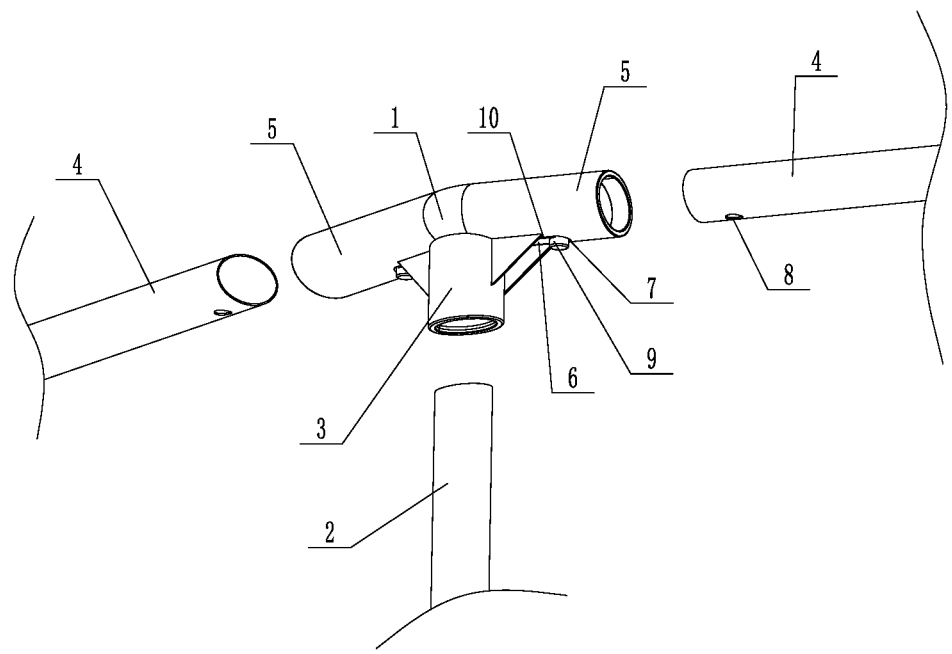
FIG. 3 is an exploded view of the joint of FIG. 2.

FIG. 1 is a structural schematic view of a swimming pool including a frame and a pool liner according to one or more example embodiments described herein. FIGS. 2 and 3 illustrate one of a plurality of joints making up the frame according to a first example embodiment. The joint of FIGS. 2 and 3 includes a joint body 1, including a leg pipe holder 3, for a leg pipe 2 to be inserted therein, and two side pipe holders 5, for side pipes 4 to be inserted respectively therein, and locking parts 6 for locking the side pipe holders 5 to the side pipes 4. An outer circumferential wall of each side pipe holder 5 has a locking hole 7 therein, and an outer circumferential wall of each end of each side pipe 4 has a connecting hole 8 therein. The locking part 6 includes a locking pin 9 configured to extend through the locking hole 7 and the connecting hole 8. At least one reinforcing rib plate 21 extends is between the outer circumferential wall of each of the two side pipe holders 5 and the outer circumferential wall of the leg pipe holder 3. As shown in FIG. 3, Two reinforcing rib plates 21 may extend between each of the side pipe holders 5 and the leg pipe holder 3. However, this number is an example and there may be one reinforcing rib plate 21 at each side of the leg pipe holder 3, or another number, as would be understood by one of skill in the art. The locking hole 7 may be formed in a lower half of the outer circumferential wall of the side pipe holder 5, and the connecting hole 8 may be formed in a corresponding lower half of the outer circumferential wall of the side pipe 4. In this example embodiment, the locking hole 7 is formed in the lowest position of the outer circumferential wall of the side pipe holder 5, the connecting hole is formed in the lowest position of the outer circumferential wall of the side pipe 4, and one locking pin 9 is provided to lock the side pipe 4 to the side pipe holder 5.

The joint body 1 may be made of a plastic material. According to an example embodiment, the joint body 1 made of the plastic material may be connected between two adjacent side pipes 4 of a swimming pool frame, such that any problem due to the rusting of a metal support may be avoided.

The outer circumferential wall of the side pipe holder 5 has a clearance groove 10 formed therein in communication with the locking hole 7. The locking part 6 is arranged in the clearance groove, with one end of the locking part 6 being integrally formed with the side pipe holder 5, and the locking pin 9 arranged at the other end of the locking part 6 and integrally formed with the locking part 6. The locking part 6 has an elongated shape and is moveable within the clearance groove 10. A gap is provided between an outer surface of the locking part 6 and an inner surface of the clearance groove 10. Upper and lower ends of the locking pin 9 extend out from the locking part 6. During assembly, after the side pipe 4 is inserted into the side pipe holder 5, the locking pin 9 pops into the connecting hole 8 in the side pipe 4 to fix and lock the side pipe 4 to the side pipe holder 5.

A swimming pool as shown in FIG. 1 includes a frame and a liner 22 supported by the frame. The frame includes a plurality of side pipes 4, a plurality of leg pipes 2, and a plurality of joints 1. The side pipes 4 and the joints connect together to form the border 23 of the frame. The ends of the side pipes 4 are inserted into side pipe holders 5 of the joints, and the side pipes 4 and the side pipe holders 5 are locked together by the locking parts 6. The swimming pool liner 22 has a substantially cylindrical shape with an open upper end and a closed lower end formed by a bottom portion of the liner 22. An upper, outer circumference of the liner 22 is connected to the border 23. A fixing belt 24 is connected to connected portions of the outer wall of the liner between adjacent leg pipes 2, and the leg pipes 2 are fed through a gap between the outer wall of the liner 22 and the fixing belt 24 between adjacent ones of the connected portions.

Figure 4:
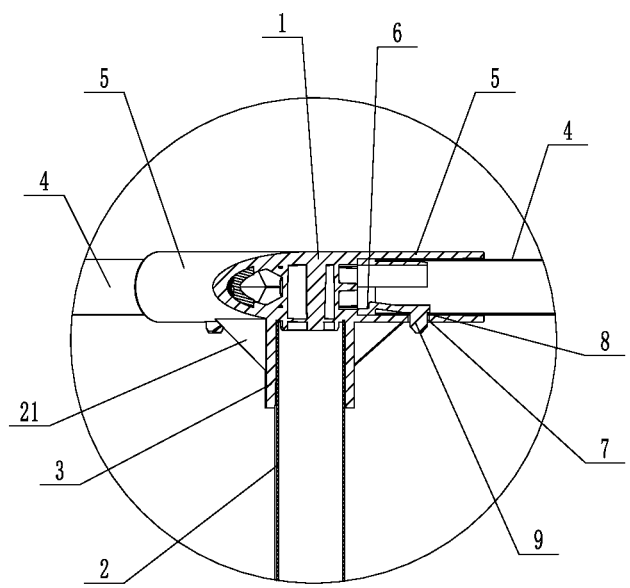
FIG. 4 is a structural schematic view of a joint according to a second example embodiment.
Figure 5:
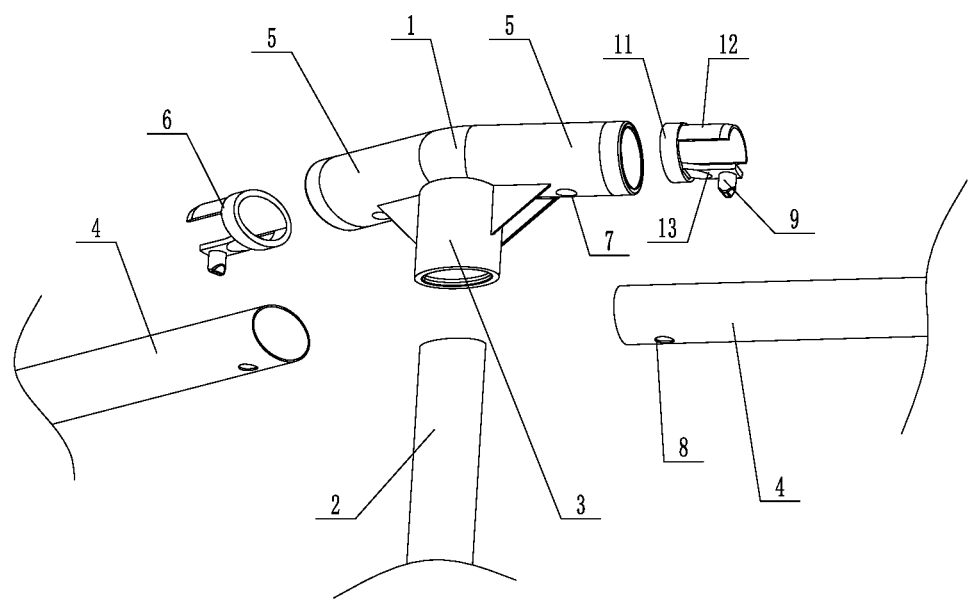
FIG. 5 is an exploded view of the joint of FIG. 4.

FIGS. 4 and 5 illustrate one of a plurality of joints included in a frame according to a second example embodiment. The joint of FIGS. 4 and 5 includes a joint body 1, including a leg pipe holder 3, two side pipe holders 5, and locking parts 6. The joint of the second example embodiment also includes locking holes 7, connecting holes 8, a locking pin 9, and reinforcing rib plates 21, similar to those discussed above with respect to the first example embodiment.

The locking part 6 of this second example embodiment is distinct from that of the first example embodiment discussed above. The locking part 6 of the second example embodiment includes a positioning ring 11, a positioning plate 12, and a locking bar 13. The positioning ring 11 has an annular structure, and the positioning plate 12 has an arc-shaped structure and is connected to the positioning ring 11. An end of the locking bar 13 is connected to the positioning ring 11, and the locking pin is disposed at the other end of the locking bar 13. The positioning ring 11 is adapted to be mounted inside the side pipe holder 5, and the positioning plate 12 and the locking bar 13 are adapted to be mounted inside the side pipe 4. The locking bar is obliquely arranged with respect to the positioning ring 11 and the positioning plate 12. The arc shape of the positioning plate has substantially the same radius of curvature as that of the positioning ring 11, and the locking bar 13 is biased to slant radially outward from the positioning ring 11, such that a distance between the locking bar 13 and a central axis of the positioning ring 11 gradually increases with distance of the locking par 13 from the positioning ring 11. An outer end of the locking pin 9 may be V-shaped or may have a spherical crown-shaped structure. The positioning ring 11, the positioning plate 12, the locking bar 13, and the locking pin 9 may be integrally formed. The positioning ring 11 is mounted in the side pipe holder 5, the positioning plate 12 and the locking bar 13 are inserted into an open end of the side pipe 4, and the locking pin 9 at the end of the locking bar 13 is biased to extend out of the connecting hole 8 in the side pipe 4 and into the locking hole 7 in the side pipe holder 5 to fix and lock the side pipe 4 to the side pipe holder 5.

As discussed above with respect to the first example embodiment, the swimming pool of FIG. 1 includes the frame and the liner 22. The frame may include a plurality of joints as described with respect to the second example embodiment.

Figure 6:
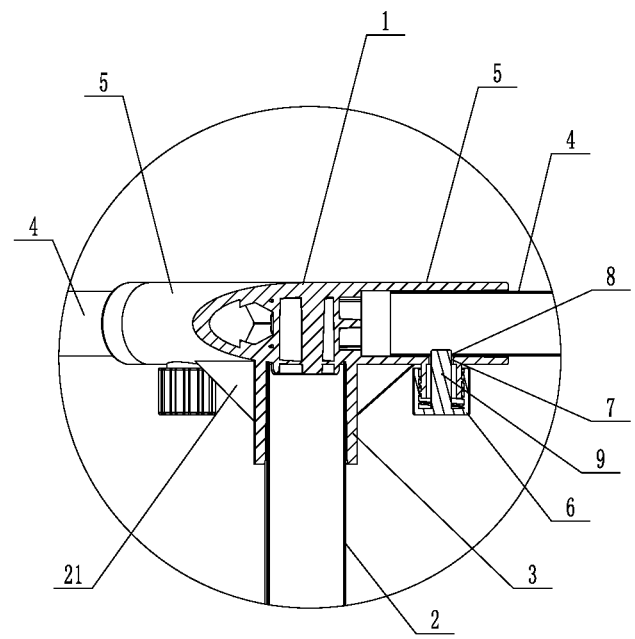
FIG. 6 is a structural schematic view of a joint according to a third example embodiment.
Figure 7:
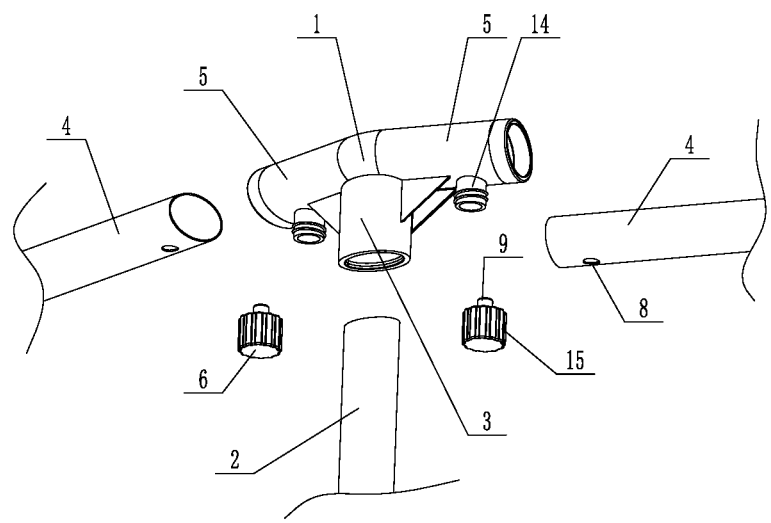
FIG. 7 is an exploded view of the joint of FIG. 6.

FIGS. 6 and 7 illustrate one of a plurality of joints included in a frame according to a third example embodiment. The joint of FIGS. 6 and 7 includes a joint body 1 including a leg pipe holder 3, two side pipe holders 5, and locking parts 6. The joint of this third example embodiment also includes locking holes 7, connecting holes 8, a locking pin 9, and reinforcing rib plates 21, similar to those discussed above with respect to the first and second example embodiments.

The locking part 6 of this third example embodiment is distinct from those of the first and second example embodiments discussed above. In this example embodiment, a connecting sleeve 14 fixedly connected to the outer wall of the side pipe holder 5, at a position corresponding to the locking hole 7, and the locking part 6 includes a barrel-type cap 15 that fits over the connecting sleeve 14. The connecting sleeve 14 is coaxial with the locking hole 7. The barrel-type cap 15 has one open end and an opposite closed end, and the locking pin 9 is arranged at the bottom of the barrel-type cap 15 and extends upward out of the barrel-type cap 15. The locking pin 9 and the barrel-type cap 15 may be integrally formed. The connecting sleeve 14 and the side pipe holder 5 may be integrally formed. The barrel-type cap 15 of the locking part 6 may be connectable to the connecting sleeve 14 via corresponding threaded portions on an inner circumference of the barrel-type cap 15 and on the outer circumference of the connecting sleeve 14. Alternately, the barrel-type cap may be connectable to the connecting sleeve 14 by a friction fit and a plurality of arc-shaped anti-slip strips which disposed on the at least one of the outer circumference of the connecting sleeve 14 and the inner circumference of the barrel-type cap 15. After the side pipe 4 and the side pipe holder 5 are assembled in place, the connecting hole 8 is aligned with the locking hole 7, the locking part 6 is fixedly connected to the outer wall of the connecting sleeve 14, and the locking pin 9 is inserted into the locking hole 7 and the connecting hole 8 to fix the side pipe 4 to the side pipe holder 5.

As discussed above with respect to the previous example embodiments, the swimming pool of FIG. 1 includes the frame and the liner 22, and the frame may include a plurality of joints as described with respect to the second example embodiment.

Figure 8:
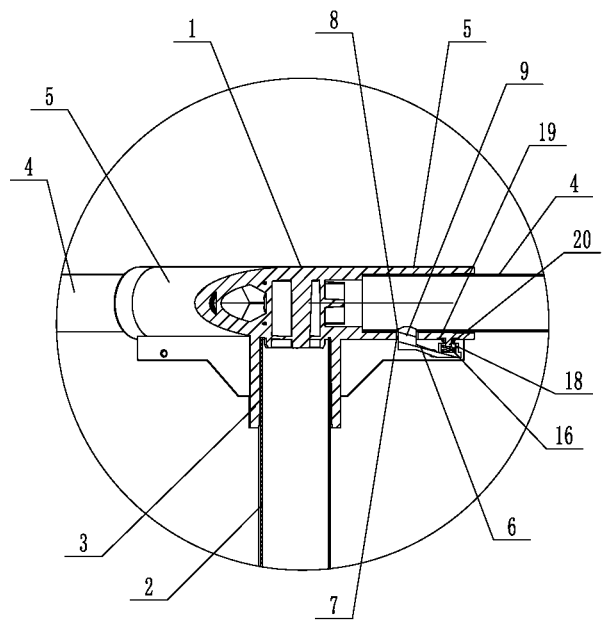
FIG. 8 is a structural schematic view of a joint according to a fourth example embodiment.
Figure 9:
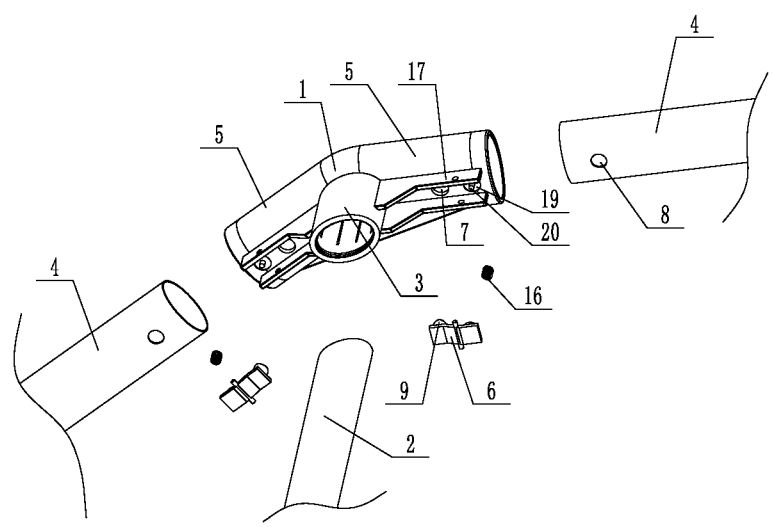
FIG. 9 is an exploded view of the joint of FIG. 7.

FIGS. 8 and 9 illustrate one of a plurality of joints included in a frame according to a fourth example embodiment. The joint of FIGS. 8 and 9 includes a joint body 1 including a leg pipe holder 3, and two side pipe holders 5, and locking parts 6. The joint of this example embodiment also includes locking holes 7, connecting holes 8, a locking pin 9, and reinforcing rib plates 21, similar to those discussed with respect to the above-described example embodiments.

The locking part 6 of this fourth example embodiment is attached to the outer circumferential wall of the side pipe holder 5 via a hinge. The locking pin 9 is arranged at one end of the locking part, and a positioning spring 16 is mounted between the other end of the locking part and the outer circumferential wall of the side pipe holder 5. Hinge lugs 17 are arranged on two sides of the locking part 6 on the outer circumferential wall of the side pipe holder 5, and the two hinge lugs 17 may be respectively integrally formed with the two reinforcing rib plates 21. The locking part 6 is hinged between the two hinge lugs 17 by a hinge shaft. Thus, the locking part 6 extends between the locking pin 9 at one end thereof and the positioning spring 16 at the other end thereof, and is attached to the outer circumferential wall of the side pipe holder 5 via a hinge disposed between the two ends of the locking part 6. A mounting sleeve 18 is disposed at the other end of the locking part 6 and is configured to hold the positioning spring 16 therein. A mounting groove 19, and a positioning column 20 arranged on a bottom surface of the mounting groove, are arranged in a position on the outer circumferential wall of the side pipe holder 5 in a position corresponding to that of the positioning spring 16. The positioning spring 16 is thus mounted on the positioning column 20 in a sleeved manner, with one end mounted in the mounting groove 19 and the other end mounted in the mounting sleeve 18. During assembly, the locking part 6 and a connecting end of the positioning spring 16 may be pressed by hand, such that the locking pin 9 is separated from the locking hole 7 in the joint for a swimming pool, the locking part 6 is released after the side pipe 4 is inserted into the side pipe holder 5, and under the action of the positioning spring 16, the locking pin 9 is sprung biased into the locking hole 7 and the connecting hole 8 to fix and hold the side pipe 4 to the side pipe holder 5.

As discussed above with respect to the previous example embodiments, the swimming pool of FIG. 1 includes the frame and the liner 22, and the frame may include a plurality of joints 1 as described with respect to the fourth example embodiment.

FIGS. 10, 11, and 12 illustrate one of a plurality of joints included in a frame according to a fifth example embodiment. The joint of FIGS. 10, 11, and 12 include a joint body 1 including a leg pipe holder 3, two side pipe holders 5, and locking parts 6. The joint of this fifth example embodiment also includes locking holes 7, connecting holes 8, a locking pin 9, and two reinforcing rib plates 21, similar to those discussed with respect to the above-described example embodiments.

The locking part 6 of this fifth example embodiment has a C-shaped structure and is clamped to the outer circumferential wall of the side pipe holder 5. The locking pin 9 is arranged on an inner wall of the locking part 6. The length of the C-shaped locking part 6 is greater than half of the circumference of the outer circumferential wall of the side pipe holder 5, and the C-shaped locking part 6 is reliably fastened to the outer circumferential wall of the side pipe holder 5. During assembly, after the side pipe 4 is inserted into the side pipe holder 5, the locking pin 9 on the locking part 6 may be aligned with the locking hole 7 and clamped on the outer circumferential wall of the side pipe holder 5, and the locking pin 9 is inserted into the locking hole 7 and into the connecting hole 8 to fix and lock the side pipe 4 to the side pipe holder 5.

As discussed above with respect to the previous example embodiments, the swimming pool of FIG. 1 includes the frame and the liner 22, and the frame may include a plurality of joints as described with respect to this fifth example embodiment.

Figure 13:
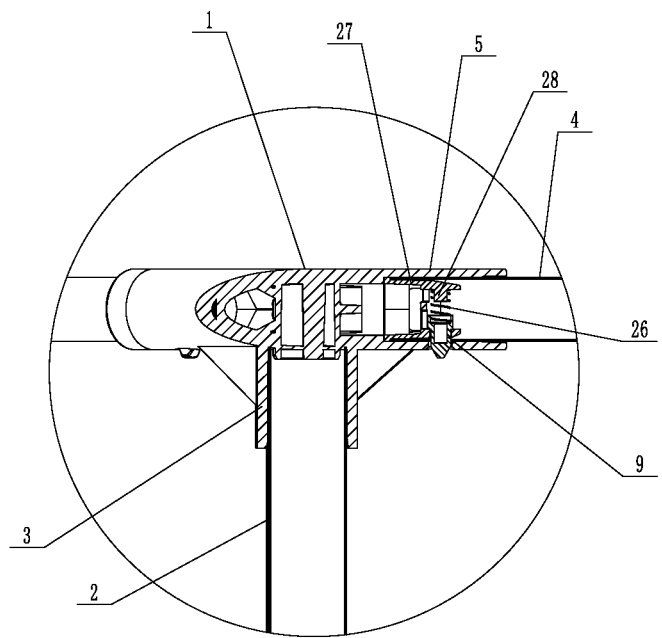
FIG. 13 is a structural schematic view of a joint according to a sixth example embodiment.
Figure 14:
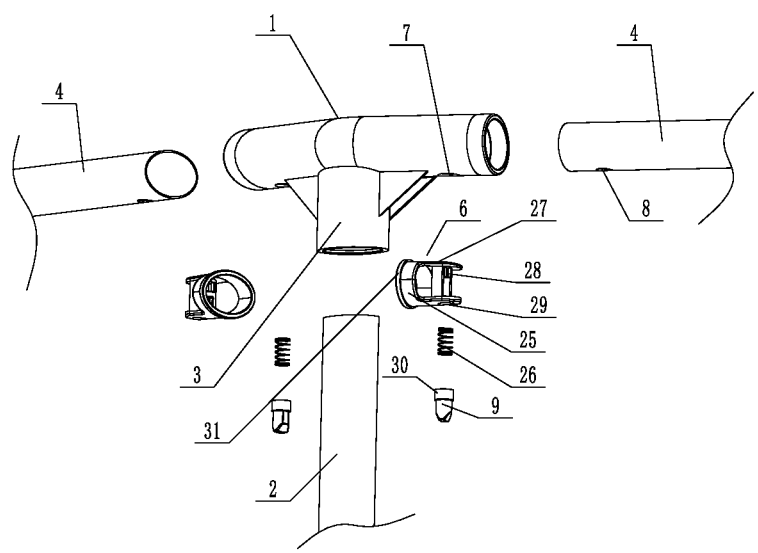
FIG. 14 is an exploded view of the joint of FIG. 13.

FIGS. 13 and 14 illustrate one of a plurality of joints included in a frame according to a sixth example embodiment. The joint of FIGS. 13 and 14 includes a joint body 1 including a leg pipe holder 3, two side pipe holders 5, and locking parts 6. The joint of this example embodiment also includes locking holes 7, connecting holes 8, a locking pin 9, and two reinforcing rib plates 21, similar to those discussed with respect to the above-described example embodiments.

The locking part 6 of this sixth example embodiment includes a mounting ring 25 and a locking spring 26, wherein the mounting ring is shaped and fit to be inserted into the side pipe 4, the locking pin 9 is mounted on the mounting ring 25, the locking spring 26 abuts between the mounting ring 25 and the locking pin 9, and the locking pin 9 extends radially outward from the mounting ring 25. The mounting ring 25 includes two oppositely arranged connecting lugs 27, wherein one connecting lug 27 includes a spring connecting column 28, and the other connecting lug 27 includes an insertion hole 29. An end of the locking pin 9 includes a positioning flange 30, the locking spring 26 is configured to be mounted onto the spring connecting column 28, the locking pin 9 and the insertion hole 29 are movably inserted together, and the positioning flange 30 abuts against the connecting lug 27. An end of the mounting ring 25 includes a flange ring 31, and the flange ring 31 is configured to abut and be attached to an end surface of the side pipe 4. During assembly, the mounting ring 25 may be arranged within the side pipe 4, the locking pin 9 extends out of the connecting hole 8 in the side pipe 4 under the bias of the locking spring 26, and the side pipe 4 is then inserted into the side pipe holder 5, so that the locking pin 9 is inserted into the locking hole 7 to fix and lock the side pipe 4 to the side pipe holder 5. Alternately, the locking part 6, including the mounting ring 25 and the flange ring 31 may be mounted within the side pipe holder 5, with the outer circumference of the flange ring 31 abutting against an inner circumferential wall of the side pipe holder 5. The side pipe 4 may then be inserted into the side pipe holder 5, around the mounting ring, such that an end of the side pipe 4 abuts against the flange ring 31.

As discussed above with respect to the first example embodiment, the swimming pool of FIG. 1 includes the frame and the liner 22. The frame may include a plurality of joints as described with respect to the sixth example embodiment.

Figure 15:
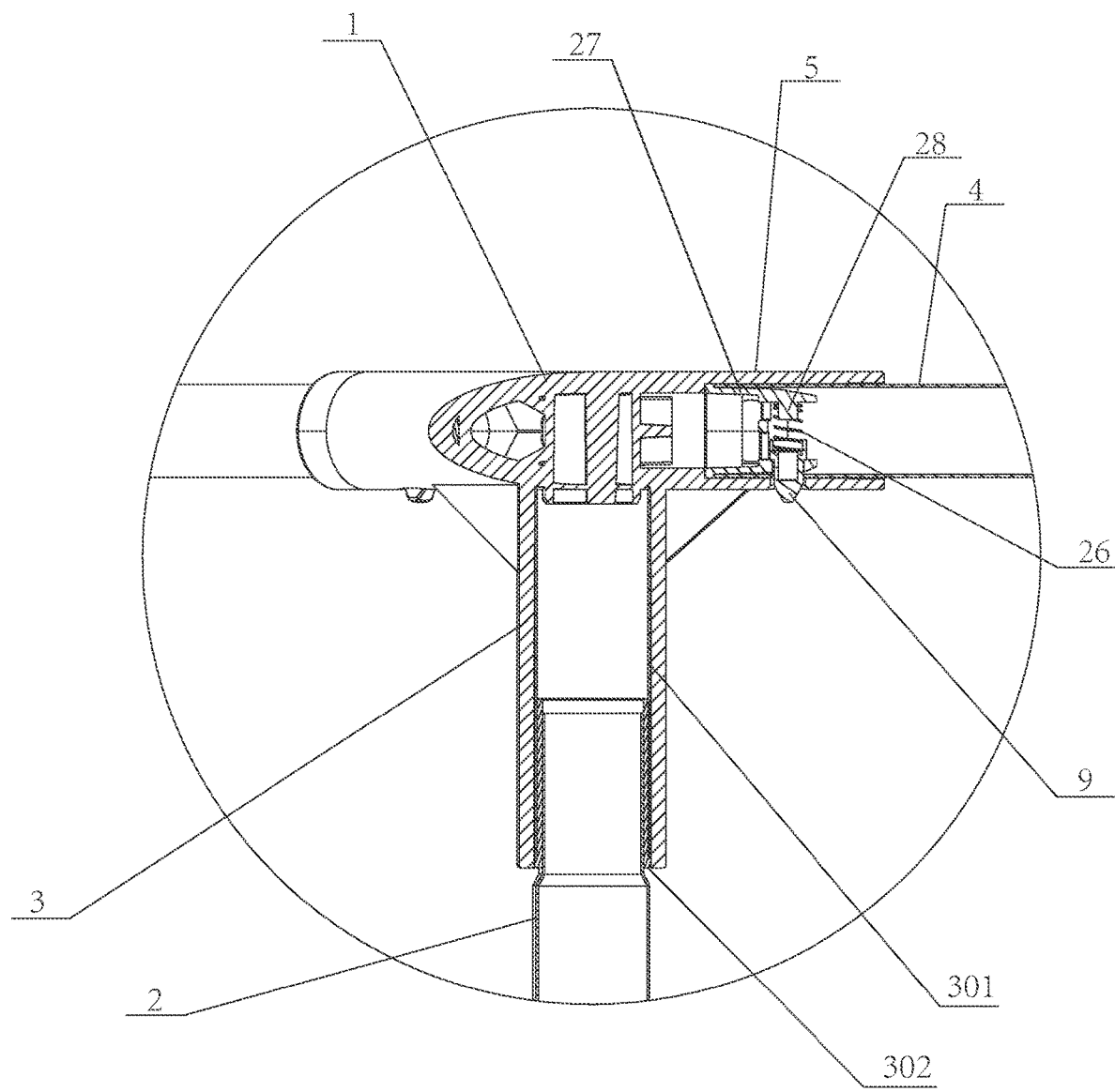
FIG. 15 is a sectional view of a joint according to a seventh example embodiment.

FIG. 15 illustrates one of a plurality of joints in a frame according to a seventh example embodiment. The joint of FIG. 15 includes a joint body 1 including a leg pipe holder 3, two side pipe holders 5, and a locking part 6. The locking part 6, as illustrated in FIG. 15, is the same as that of the sixth example embodiment, discussed above with respect to FIGS. 13 and 14. Alternately, the locking part 6 could be the same as or similar to the locking part 6 of any of the other example embodiments as discussed herein.

The joint of this seventh example embodiment additionally includes a metal pipe 301 disposed within the inner circumferential wall of the leg pipe holder 3. The metal pipe 301 increases a strength of the joint as compared to a joint without the metal pipe 301. The joint of this example embodiment also includes a plastic sleeve tube 302 disposed between the leg pipe 2 and the metal pipe 301. The plastic sleeve tube may limit the generation of rust on the leg pipe 2, the metal pipe 301, and the leg pipe holder 3.

As discussed above with respect to the first example embodiment, the swimming pool of FIG. 1 includes the frame and the liner 22. The frame may include a plurality of joints as described with respect to the seventh example embodiment.

It may be understood that the example embodiments described herein may be considered in a descriptive sense only and not for purposes of limitation. Descriptions of features or aspects within each exemplary embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:
1. A joint for a swimming pool frame, the joint comprising:
a joint body comprising:
a leg pipe holder configured to have a leg pipe of the swimming pool frame inserted therein, and
a side pipe holder configured to have a side pipe of the swimming pool frame inserted therein, and comprising a locking hole formed therethrough;
a locking part comprising a locking pin configured to extend through the locking hole and through a corre- sponding connecting hole in the side pipe, thereby holding the side pipe to the side pipe holder; and a metal pipe disposed within an inner circumferential wall of the leg pipe holder.

2. The joint according to claim 1, comprising two of the side pipe holders and two of the locking parts, each of the two locking parts holding a respective side pipe to a respective one of the two side pipe holders.

3. The joint according to claim 1, wherein:
the locking hole is formed through a lower half of an outer circumferential wall of the side pipe holder, and
the connecting hole is formed through a lower half of an outer circumferential wall of the side pipe.

4. The joint according to claim 1, further comprising a plastic sleeve tube disposed within an inner circumferential wall of the metal pipe.

5. The joint according to claim 1, wherein the joint body is made of a plastic material.

6. The joint according to claim 1, wherein the locking part further comprises:
a mounting ring configured to fit within the side pipe holder and within an end of the side pipe, wherein the locking pin is mounted on the mounting ring;
a locking spring disposed between the mounting ring and the locking pin and biasing the locking pin outward from the mounting ring.

7. A swimming pool, comprising:
a liner; and
a frame configured to support the liner, the frame comprising:
a plurality of side pipes,
a plurality of leg pipes, and
a plurality of joints, the plurality of side pipes and the plurality of joints being alternately connected and thereby forming an annular swimming pool border, each of the plurality of joints comprising:
a joint body comprising a leg pipe holder configured to have a leg pipe of the plurality of leg pipes inserted therein, and a side pipe holder configured to have a side pipe of the plurality of side pipes inserted therein, the side pipe holder comprising a locking hole formed therethrough,
a locking part comprising a locking pin configured to extend through the locking hole and through a corresponding connecting hole in the side pipe, thereby holding the side pipe to the side pipe holder, and
a meal pipe disposed within an inner circumferential wall of the leg pipe holder.

8. The swimming pool according to claim 7, the joint comprising two of the side pipe holders and two of the locking parts, each of the two locking parts holding a respective side pipe to a respective one of the two side pipe holders.

9. The swimming pool according to claim 7, wherein:
the locking hole is formed through a lower half of an outer circumferential wall of the side pipe holder, and
the connecting hole is formed through a lower half of an outer circumferential wall of the side pipe.

10. The swimming pool according to claim 7, wherein the locking part further comprises:
a mounting ring configured to fit within the side pipe holder and within an end of the side pipe, wherein the locking pin is mounted on the mounting ring;
a locking spring disposed between the mounting ring and the locking pin and biasing the locking pin outward from the mounting ring.

11. The swimming pool according to claim 7, wherein each of the plurality of joints further comprises a plastic sleeve disposed within an inner circumferential wall of the metal pipe and configured to have the leg pipe of the plurality of leg pipe inserted therein.

12. The swimming pool according to claim 7, wherein the joint body is made of a plastic material.

* * * * *